UNITED STATES PATENT OFFICE.

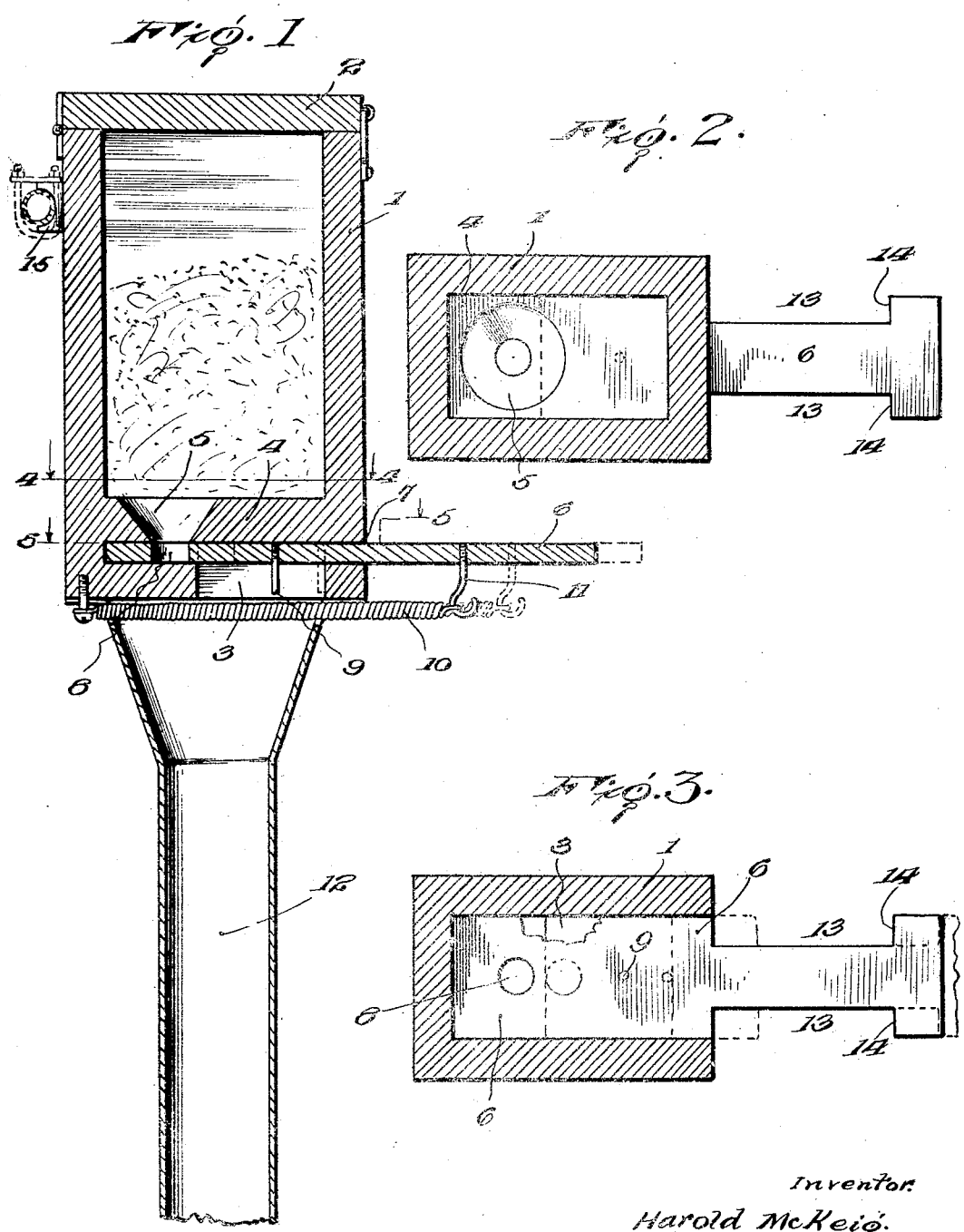

HAROLD McKEIG, OF HARLAN, IOWA.

REPLANTING ATTACHMENT FOR CULTIVATORS.

1,367,916.   Specification of Letters Patent.   Patented Feb. 8, 1921.

Application filed October 24, 1919. Serial No. 332,988.

*To all whom it may concern:*

Be it known that I, HAROLD McKEIG, a citizen of the United States, residing at Harlan, in the county of Shelby and State of Iowa, have invented certain new and useful Improvements in Replanting Attachments for Cultivators, of which the following is a specification.

This invention relates to replanting attachments for cultivators and has for its object the provision of a small and inexpensive mechanism which may be secured to the frame of a cultivator and operated at the will of the driver to deposit seed in those hills in which the previously planted seed has not sprouted. The invention is illustrated in the accompanying drawings and consists in certain novel features which will be particularly pointed out in the claim following the detailed description.

In the drawings, Figure 1 is a vertical longitudinal section of my improved planting attachment, Fig. 2 is a horizontal section on the line 4—4 of Fig. 1.

Fig. 3 is a horizontal section on the line 5—5 of Fig. 1.

In carrying out my invention, I employ a hopper 1 which may be of any preferred form and dimensions and is illustrated as a substantially rectangular box having a swinging cover or top 2 and provided in its bottom with an opening or slot 3 and also constructed with a false bottom 4 having a seed discharge opening 5 therein. Between the bottom 3 and the false bottom 4, I mount the seed dropping slide 6 which extends through a slot or opening 7 in one side wall of the hopper and is guided in its movement by the walls, the bottom, and the false bottom. It will be noted upon reference to Fig. 1 that the openings 3 and 5 are out of alinement and the seed dropper or slide is provided near its extremity with an opening 8 which normally registers with the opening 5 in the false bottom and the discharge from which is normally prevented by the solid or unmutilated portion of the bottom. A pin or stirrer 9 depends from the slide and plays in the slot 3 in the bottom of the hopper, as clearly shown in Fig. 1 so that the grain or other seed will be prevented from choking in the slot and thereby clogging the operation of the device. The slide or dropper is normally held retracted or in the position shown in Fig. 1 by a spring 10 which has one end secured to the hopper in any desired manner and has its opposite end engaged upon a depending hook 11 carried by the outer portion of the slide. The seed spout 12 is secured to and depends from the hopper and the upper end of the seed spout extends around the discharge opening or slot 3 as will be readily understood. In the opposite side edges of the projecting portion of the slide, I form recesses or notches 13 whereby shoulders 14 are formed and it will be understood that these shoulders may be engaged by the foot of the driver or by a rod extending to the driver's seat as may be preferred.

Upon one side wall of the hopper I secure, exteriorly, a bracket 15 which is engaged upon and secured to the cultivator frame to support the hopper so that as the cultivator is drawn along the field the spout will travel directly over the row of hills being cultivated.

The use of the device is thought to be obvious. Normally the slide is retracted so that the seed in the hopper gravitating through the discharge opening 5 will have a portion caught in the opening 8 of the slide but held in said opening by the bottom of the hopper. When a barren hill has been reached, the driver will withdraw the slide and the seed in the opening 8 will thereby be drawn over the discharge opening 3 and will at once fall through the spout to the hill, loose dirt being thrown over the seed so deposited and covering the same by the action of the cultivator blades. When the withdrawing force has been released, the spring 10 will at once return the slide to its initial position whereupon an additional quantity of seed will fall into the opening 8. The agitator pin 9 not only serves to prevent clogging and choking of the discharge slot 3 but also limits the outward movement of the slide by coming in contact with the outer wall of the slot as indicated by the dotted lines in Fig. 1, the imperforate or unmutilated end of the slide being thereby held in the opening 5 so that the fall of seed will be arrested until the slide is again retracted.

It will be readily noted that I have provided an exceedingly simple and inexpensive planting attachment which may be readily applied to any cultivator frame and easily manipulated by the driver so that the replanting of the barren hills will be accomplished expeditiously. The bracket 15 which supports the hopper may be secured to the cultivator frame at any desired height of the same as will be readily understood.

Having thus described the invention, what is claimed as new is:

A replanting attachment for cultivators consisting of a hopper provided on one side with a clamp whereby it may be secured to the frame of a cultivator, the hopper being further provided with a bottom and a false bottom having openings therein arranged out of axial alinement, a dropper slide mounted between the bottom and the false bottom and guided by the same and by the walls of the hopper, said slide having one end extending through and beyond the side of the hopper and being provided with a seed opening in its inner end, a pin depending from the slide and playing in the opening in the bottom of the hopper to prevent choking thereof and to limit the outward movement of the slide, and a spring extending across the bottom of the hopper and secured to the hopper and the slide to hold the slide normally retracted, the slide being constructed to be engaged by a withdrawing instrumentality.

In testimony whereof I affix my signature.

HAROLD McKEIG. [L. S.]